US011238332B2

(12) United States Patent
Ainslie et al.

(10) Patent No.: US 11,238,332 B2
(45) Date of Patent: Feb. 1, 2022

(54) ATTENTION NEURAL NETWORKS WITH SPARSE ATTENTION MECHANISMS

(71) Applicant: Google LLC, Mountain View, CA (US)

(72) Inventors: Joshua Timothy Ainslie, Saratoga, CA (US); Santiago Ontañón, Mountain View, CA (US); Philip Pham, Seattle, WA (US); Manzil Zaheer, Mountain View, CA (US); Guru Guruganesh, Mountain View, CA (US); Kumar Avinava Dubey, Palo Alto, CA (US); Amr Ahmed, Mountain View, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 17/341,193

(22) Filed: Jun. 7, 2021

(65) Prior Publication Data

US 2021/0383191 A1 Dec. 9, 2021

Related U.S. Application Data

(60) Provisional application No. 63/035,632, filed on Jun. 5, 2020.

(51) Int. Cl.
*G06N 3/04* (2006.01)
*G06N 3/08* (2006.01)
*G06N 3/063* (2006.01)
*G06N 20/00* (2019.01)

(52) U.S. Cl.
CPC ............. *G06N 3/04* (2013.01); *G06N 3/063* (2013.01); *G06N 3/084* (2013.01); *G06N 20/00* (2019.01)

(58) Field of Classification Search
CPC .......... G06N 3/04; G06N 3/063; G06N 3/084; G06N 20/00
See application file for complete search history.

(56) References Cited

PUBLICATIONS

Laha, Anirban et al.; On Controllable Sparse Alternatives to Softmax; On Controllable Sparse Alternatives to Softmax; pp. 1-16. (Year: 2018).*
Peters, Ben et al.; Sparse Sequence-to-Sequence Models; modarXiv:1905.05702v2 [cs.CL] Jun. 12, 2019; 17 pages. (Year: 2019).*
Cui, Baiyn et al.; Fine-tune BERT with Sparse Self-Attention Mechanism; 2019 Association for Computational Linguistics; pp. 3448-3553. (Year: 2019).*
Gan, Chequan et al.; Sparse attention based separable dilated convolutional neural network for targeted sentiment analysis; 2020 ELSEVIER; Knowledge-Based Systems 188 (2020) 104827; pp. 1-10. (Year: 2020).*

(Continued)

*Primary Examiner* — Stanley K. Hill
(74) *Attorney, Agent, or Firm* — Fish & Richardson P.C.

(57) ABSTRACT

Methods, systems, and apparatus, including computer programs encoded on computer storage media, for processing network inputs using an attention neural network that has one or more sparse attention sub-layers. Each sparse attention sub-layer is configured to apply a sparse attention mechanism that attends differently for input positions that are in a first proper subset of the input positions in the input to the sub-layer than for positions that are not in the first proper subset.

20 Claims, 4 Drawing Sheets

(56) References Cited

PUBLICATIONS

Gan, Chenquan et al.; Multi-entity sentiment analysis using self-attention based hierarchical dilated convolutional neural network; 2020 ELSEVIER; Future Generation Computer Systems 112 (2020) 116-125. (Year: 2020).*
Zhang, Biao etal; Sparse Attention with Linear Units; arXiv:2104.07012v1 [cs.CL] Apr. 114, 2021; 14 pages. (Year: 2021).*
Abboud et al, "Consequences of faster alignment of sequences" International Colloquium on Automata, Languages, and Programming, 2014, 12 pages.
Aboud et al, "Tight hardness results for lcs and other sequence similarity measures" IEEE, 2019, 20 pages.
Backurs et al, "Edit distance canot be computed in strongly subquadratic time (unless seth is false)" arXiv, 2015, 15 pages.
Beltagy et al, "Longformer: The long-document transformer" arXiv, 2020, 17 pages.
Buldyrev et al, "Long-range correlation properties of coding and noncoding dna sequences: Genbank analysis" Physical Review, 1995, 8 pages.
Busia et al, "A deep learning approach to pattern recognition for short dna sequences" BioRxiv, 2018, 34 pages.
Chen et al, "Distilling the knowledge of bert for text generation" arXiv, 2020, 13 pages.
Chen et al, "Multi-hop question answering via reasoning chains" arXiv, 2019.
Child et al, "Generating long sequences with sparse transformers" arXiv, 2019, 10 pages.
Clark et al, "What does bert look at? An analysis of bert's attention" arXiv, 2019, 11 pages.
Dai et al, "Transformer-XL: Attentive Language Models Beyond a Fixed-Length Context" arXiv, 2019, 20 pages.
Devlin et al, "BERT: Pre-training of Deep Bidirectional Transformers for Language Understanding" arXiv, 2019, 16 pages.
Dreos et al, "Epd and epdnew, high-quality promoter resources in the next-generation sequencing era" nucleic acids research, 2013, 8 pages.
Fang et al, "Hierarchical graph network for multi-hop question answering" arXiv, 2020, 16 pages.
Gates et al, "Histone marks in the 'driver's seat': functional roles in steering the transcription cycle" Trends in biochemical sciences, 2017, 13 pages.
Ghandi et al, "Enhanced regulatory sequence prediction using gapped k-mer features" PLoS computational biology, 2014, 16 pages.
Gnu et al, "Realm: Retrieval-augmented language model pre-training" arXiv, 2020, 12 pages.
He et al, "Long document classification from local word glimpses via recurrent attetnion learning" IEEE, 2019, 12 pages.
Hochreiter et al, "Long short-term memory" Neural Computation, 1997, 46 pages.
Hoory et al, "Expander graphs and their applications" Bulletin of the American Mathematical Society, 2006, 123 pages.
Khurana et al, "Role of non-coding sequence variants in cancer" Nature Reviews Genetics, 2016, 16 pages.
Kitaev et al, "Reformer: The Efficient Transformer" arXiv, 2020, 12 pages.
Kudo et al, "Sentencepiece: A simple and language independent subword tokenizer and detokenizer for neural text processing" arXiv, 2018, 6 pages.
Kumar et al, "Data aumentation using pre-trained transformer models" arXiv, 2021, 9 pages.
Kwiatkowski et al, "Natural questions: a benchmark for question answering research" Transactions of the Association for Computational Linguistics, 2019, 14 pages.
Lee et al, "Latent retrieval for weakly supervised open domain question answering" arXiv, 2019, 11 pages.
Levy et al, "Methylnet: an automated and modular deep learning approach for dna methylation analysis" BMC bioinformatics, 2020, 15 pages.
Lewis et al, "Retrieval-augmented generation for knowledge-intensive NLP tasks" arXiv, 2021, 19 pages.
Liang, "Segmenting DNA sequence into words based on statistical language model" Nature Precedings, 2012, 12 pages.
Lin et al, "Identifying sigma70 promoters with novel pseudo nucleotide compositoin" IEEE, 2017, 6 pages.
Lin et al, "What makes a good answer? The role of contect in question answering" INERACT, 2003, 8 pages.
Liu et al, "Reading wikipedia pages for natural question answering" arXiv, 2020, 10 pages.
Liu et al, "Roberta: A robustly optimized bert pretraining approach" arXiv, 2019, 13 pages.
Martin et al, "Camembert: a tasty french language model" arXiv, 2020, 17 pages.
Miller, "Leveraging bert for extractive text summarization on lectures" arXiv, 2019, 7 pages.
Olson et al, "Adapting pretrained language models for long document classification" Open Review, 2020, 12 pages.
Oubounyt et al, "Deepromoter: Robust promoter predictor using deep learning" Frontiers in genetics, 2019, 22 pages.
Perez et al, "On the turing completeness of modern neural network architectures" arXiv, 2019, 36 pages.
Qiu et al, "Blockwise self-attention for long document understanding" arXiv, 2020, 12 pages.
Rae et al, "Compressive transformers for long-range sequence modelling" arXiv, 2019, 19 pages.
Raffel et al, "Exploring the Limits of Transfer Learning with a Unified Text-to-Text Transformer" arXiv, 2020, 67 pages.
Spielman et al, "Spectral sparsification of graphs" SIAM Journal on Computing, 2011, 45 pages.
Strubell et al, "Energy and policy considerations for deep learning in NLP" arXiv, 2019, 6 pages.
Sukhbaatar et al, "Adaptive attention span in transformers" arXiv, 2019, 5 pages.
Sun et al, "Utilizing bert for aspect-based sentiment analysis via constructing auxiliary sentence" arXiv, 2019, 6 pages.
Tampuu et al, "Viraminer: Deep learning on raw DNA sequences for identifying viral genomes in human samples" PLoS, 2019, 17 pages.
Trinh et al, "A simple method for commonsense reasoning" arXiv, 2019, 12 pages.
Tn et al, "Multi-hop reading comprehension across multiple documents by reasoning over heterogenous graph" arXiv, 2019, 10 pages.
Umarov et al, "Recognition of prokaryotic and eukaryotic promoters using convolutional deep learning neural networks" PLoS, 2017, 12 pages.
Vaswani et al, "Attention Is All You Need" arXiv, 2017, 15 pages.
Wang et al, "Multi-passage BERT: A globally normalized BERT model for open-domain question answering" arXiv, 2019, 5 pages.
Welbl et al, "Constructing datasets for multi-hop reading comprehension across documents" TACL, 2018, 16 pages.
Williams, "A new algorithm for optimal 2-constraint satisfaction and its implications" Theoretical Computer Science, 2005, 9 pages.
Xiao et al, "IPSW (21)-pseknc: A two-layer predictor for identifying promoters and their strength by hybrid features via pseudo k-tuple nucleotide composition" Genomics, 2019, 9 pages.
Yang et al, "Exploiting sequence-based features for predicting enhancer-promoter interactions" Bioinformatics, 2017, 9 pages.
Yang et al, "Hotpotqa: A dataset for diverse, explainable multi-hop question answering" arXiv, 2018, 12 pages.
Yang et al, "XInet: Generalized autoregressive pretraining for language understanding" NIPS, 2019, 11 pages.
Ye et al, "Bp-transformer: Modelling long-range context via binary partitioning" arXiv, 2019, 11 pages.
Yun et al, "Are transformers universal approximators of sequence-to-sequence functions?" arXiv, 2020, 23 pages.
Zhang et al, "Character-level convolutional networks for text classification" arXiv, 2015, 9 pages.
Zhang et al, "Learning the language of the genome using RNNs" Standford, 2017, 8 pages.

(56) References Cited

PUBLICATIONS

Zhang et al, "NcNet: Deep learning network models for predicting function of non-coding DNA" Frontiers in Genetics, 2019, 9 pages.
Zhou et al, "Predicting effects of noncoding variants with deep learning based sequence model" Nature methods, 2015, 8 pages.
Zhu et al, "Aligning books and movies: Towards story-like visual explanations by watching movies and reading books" arXiv, 2015, 23 pages.
Lample et al., "Large Memory Layers with Product Keys" arXiv, 2019, 12 pages.
PCT International Search Report and Written Opinion in International Application No. PCT/US2021/036252, dated Oct. 12, 2021, 16 pages.
Subramanian et al., "Multi-scale transformer language models" arXiv, 2020, 18 pages.

* cited by examiner

ATTENTION NEURAL NETWORKS WITH SPARSE ATTENTION MECHANISMS

CROSS-REFERENCE TO RELATED APPLICATION

This application claims priority to U.S. Provisional Application No. 63/035,632, filed on Jun. 5, 2020. The disclosure of the prior application is considered part of and is incorporated by reference in the disclosure of this application.

BACKGROUND

This specification relates to performing a machine learning task on a network input using neural networks.

Neural networks are machine learning models that employ one or more layers of nonlinear units to predict an output for a received input. Some neural networks include one or more hidden layers in addition to an output layer. The output of each hidden layer is used as input to the next layer in the network, i.e., the next hidden layer or the output layer. Each layer of the network generates an output from a received input in accordance with current values of a respective set of parameters.

SUMMARY

This specification describes a system implemented as computer programs on one or more computers in one or more locations that performs a machine learning task on a network input using an attention neural network that includes attention sub-layers that apply sparse attention.

Particular embodiments of the subject matter described in this specification can be implemented so as to realize one or more of the following advantages.

The techniques described in this specification allow a neural network system to process input sequences, generate output sequences, or both more efficiently than existing attention-based networks both during training and at runtime, i.e., in terms of computational resources (e.g., memory, computing power, or both), by making use of a sparse attention mechanism.

The attention layers within some existing attention neural networks employ a dot-product attention mechanism which involves computing, for every given query, respective dot products of the query with all of the keys. The networks typically derive such keys or queries from network inputs that may be sequential. Thus the computational cost could be substantial when applying a dot-product attention mechanism over sequential data that is of significant length. In particular, conventional self-attention layers have a quadratic dependency on the sequence length, resulting in the model consuming a large amount of computational resources when operating on or generating longer sequences. The described techniques, however, address these problems by applying a sparse attention mechanism to effectively restrict the number of attention computations that are performed at each attention layer while maintaining comparable output quality as conventional self-attention neural networks. In particular, by having the majority of positions attend to only a sparse subset of other positions while having a much smaller subset of positions (of size O(1) compared to sequence length) attend to all of the positions (and be attended to by all of the positions), the system can effectively propagate sequence-long context and ensure high quality outputs while maintaining computational efficiency even for very long sequences. As a particular example, using the described sparse attention, the attention neural network can perform effectively even for tasks that require operating on sequences that have long-range dependencies over 4000 or more tokens, e.g., while having fewer than 100 global tokens that attend to the entire sequence. Thus, the first proper subset of positions that includes the global tokens can be include no more than 3/100ths as many tokens as the second proper subset that includes the other tokens.

More specifically, the described techniques allow self-attention neural networks to be deployed under memory constraints, i.e. within a more limited memory space compared to the memory space that is required when the described techniques are not employed. As a particular example, modern hardware chips that perform the multiplications required for self-attention mechanisms have limited on-chip memory. As another example, edge computing devices, e.g., mobile phones, have limited on-device memory. By sparsifying the self-attention mechanism, the described techniques allow attention neural networks to generate high quality outputs while operating within this constrained memory space, i.e., when the attention neural network is deployed on, and the attention mechanism is therefore applied by, one or more devices having limited device memory. In particular, by using the query at a given input position to attend over all of the keys in the sequence of keys only for input positions that are in a first proper subset of the input positions while, for input positions in a second proper subset of the input positions, using the query for the input position to attend over only the keys at a corresponding proper subset of the input positions, the described techniques greatly reduce the number of keys that need to be loaded into the constrained memory space in order to compute the attended input for the input positions in the second subset. This allows the described self-attention mechanism to be effectively performed within the constrained memory space. However, because, for the positions in the first proper subset, the query for the position is still used to attend to all of the keys at all of the input positions and, for input positions in the second proper subset, the query for the position is used to attend to all of the keys for all of the positions in the first subset, the system can still propagate information across all of the input positions and ensure a high-quality output. Additionally, when the corresponding proper subset for any given position in the second subset includes (i) one or more input positions randomly selected from the input positions that are outside of the first proper subset and (ii) each input position that is within a window of a fixed number positions of the input position in the second proper subset, the system can generate high quality outputs even when the number of positions in the corresponding proper subset is small relative to the total number of positions in the second subset, further reducing the number of keys that need to be loaded into memory in order to apply the attention mechanism for the positions in the second subset. Moreover, because there are generally many more positions in the second subset than in the first subset, the overall reduction in the number of keys that need to be loaded into memory in order to apply the self-attention mechanism for the entire layer input is significant, while still ensuring that a high quality output is generated by the self-attention mechanism.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
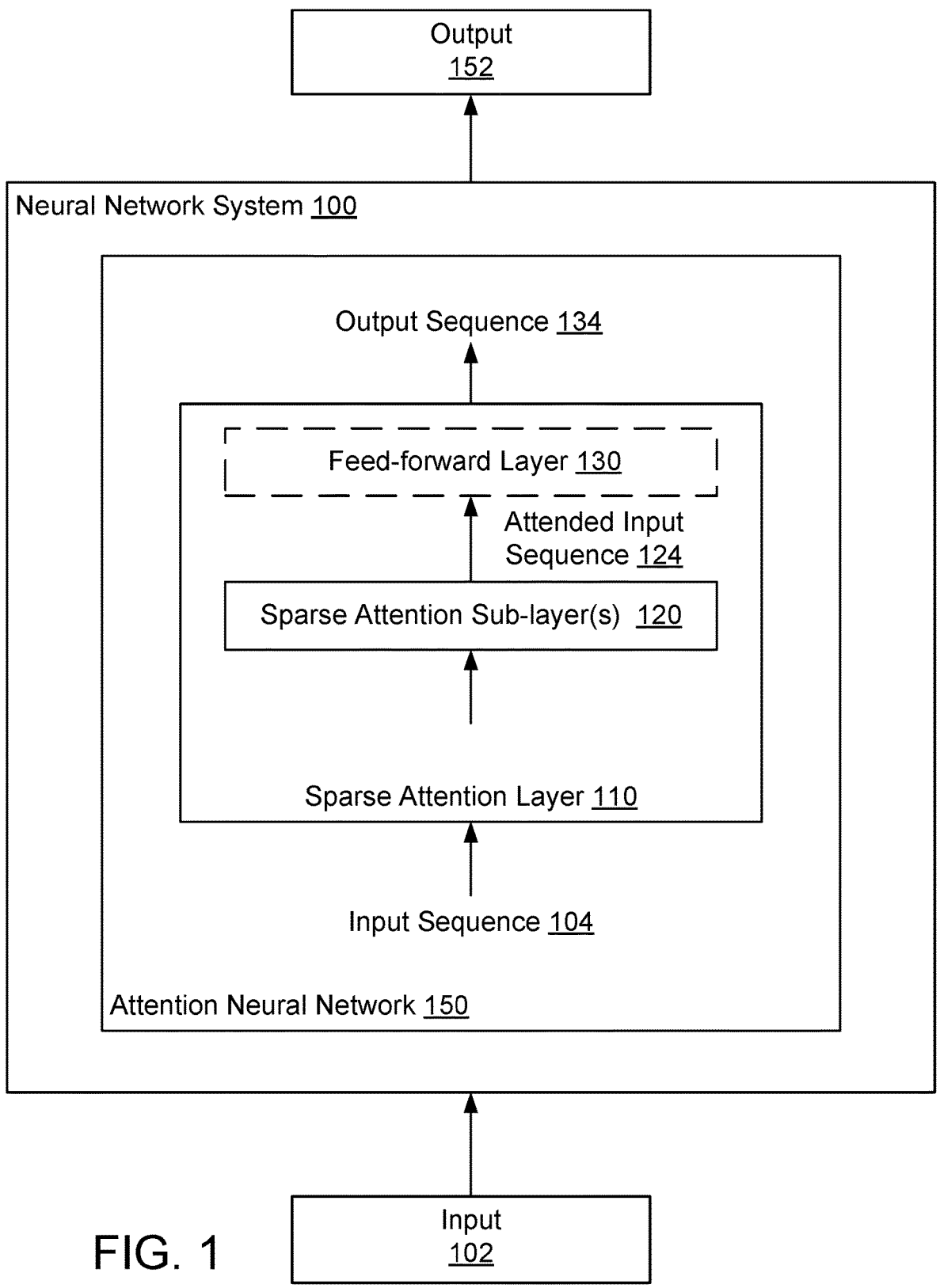
FIG. 1 shows an example neural network system.

This specification describes a system implemented as computer programs on one or more computers in one or more locations that performs a machine learning task on a network input to generate a network output for the machine learning task.

The machine learning task can be any machine learning task that (i) operates on a network input that is an input sequence, (ii) generates a network output that is an output sequence, or (iii) both.

Some examples of machine learning tasks that the system can be configured to perform follow.

As one example, the task may be a neural machine translation task. For example, if the input to the neural network is a sequence of text, e.g., a sequence of words, phrases, characters, or word pieces, in one language, the output generated by the neural network may be a translation of the sequence of text into another language, i.e., a sequence of text in the other language that is a translation of the input sequence of text. As a particular example, the task may be a multi-lingual machine translation task, where a single neural network is configured to translate between multiple different source language—target language pairs. In this example, the source language text may be augmented with an identifier that indicates the target language into which the neural network should translate the source language text.

As another example, the task may be an audio processing task. For example, if the input to the neural network is a sequence representing a spoken utterance, the output generated by the neural network may be a score for each of a set of pieces of text, each score representing an estimated likelihood that the piece of text is the correct transcript for the utterance. As another example, if the input to the neural network is a sequence representing a spoken utterance, the output generated by the neural network can indicate whether a particular word or phrase ("hotword") was spoken in the utterance. As another example, if the input to the neural network is a sequence representing a spoken utterance, the output generated by the neural network can identify the natural language in which the utterance was spoken.

As another example, the task can be a natural language processing or understanding task, e.g., an entailment task, a paraphrase task, a textual similarity task, a sentiment task, a sentence completion task, a grammaticality task, and so on, that operates on a sequence of text in some natural language.

As another example, the task can be a text to speech task, where the input is text in a natural language or features of text in a natural language and the network output is a spectrogram, a waveform, or other data defining audio of the text being spoken in the natural language.

As another example, the task can be a health prediction task, where the input is a sequence derived from electronic health record data for a patient and the output is a prediction that is relevant to the future health of the patient, e.g., a predicted treatment that should be prescribed to the patient, the likelihood that an adverse health event will occur to the patient, or a predicted diagnosis for the patient.

As another example, the task can be a text generation task, where the input is a sequence of text, and the output is another sequence of text, e.g., a completion of the input sequence of text, a response to a question posed in the input sequence, or a sequence of text that is about a topic specified by the first sequence of text. As another example, the input to the text generation task can be an input other than text, e.g., an image, and the output sequence can be text that describes the input.

As another example, the task can be an image generation task, where the input is a conditioning input and the output is a sequence of intensity value inputs for the pixels of an image.

As another example, the task can be an agent control task, where the input is a sequence of observations or other data characterizing states of an environment and the output defines an action to be performed by the agent in response to the most recent data in the sequence. The agent can be, e.g., a real-world or simulated robot, a control system for an industrial facility, or a control system that controls a different kind of agent.

As another example, the task can be a genomics task, where the input is a sequence representing a fragment of a DNA sequence or other molecule sequence and the output is either an embedding of the fragment for use in a downstream task, e.g., by making use of an unsupervised learning technique on a data set of DNA sequence fragments, or an output for the downstream task. Examples of downstream tasks include promoter site prediction, methylation analysis, predicting functional effects of non-coding variants, and so on.

In some cases, the machine learning task is a combination of multiple individual machine learning tasks, i.e., the system is configured to perform multiple different individual machine learning tasks, e.g., two or more of the machine learning tasks mentioned above. For example, the system can be configured to perform multiple individual natural language understanding tasks, with the network input including an identifier for the individual natural language understanding task to be performed on the network input.

To perform the machine learning task, the system includes an attention neural network that includes multiple attention layers. Each layer operates on a respective input sequence that includes a respective layer input at each of one or more positions.

Moreover, each of the layers includes an attention sub-layer and, optionally, a position-wise feed-forward sub-layer. The attention sub-layer receives the input sequence for the layer and applies an attention mechanism on the input sequence for the layer to generate an attended input sequence.

The attention mechanism applied by the attention sub-layer depends on the configuration of the attention neural network, as will be described in more detail below, however, at least one of the attention sub-layers applies an attention mechanism that uses sparse attention, as will be described below.

When included, the feed-forward sub-layer then operates on the attended input sequence to generate an output sequence for the layer.

When no feed-forward sub-layer is included, the attended input sequence is the output sequence for the layer.

Generally, the layers within the attention neural network can be arranged in any of a variety of configurations.

As one example, when the network input is an input sequence, the attention neural network includes an encoder neural network that includes a subset of the plurality of layers and that encodes the input sequence to generate a respective encoded representation of each input in the sequence. In this example, the attention mechanism applied by the layers in the encoder is a self-attention mechanism. In this example, some or all of the layers in the encoder can apply the sparse attention mechanism that will be described below.

As another example, the attention neural network includes a decoder neural network that includes a different subset of the plurality of layers and that processes either the network input or the encoded representation of the network input to generate the network output. In some of these examples, when the network output is an output sequence, the decoder neural network operates auto-regressively and the attention sub-layers within some or all of the layers of the decoder apply masked self-attention over the partially generated output sequence. When the neural network includes both an encoder and a decoder, some of the layers in the decoder apply cross-attention into the encoded representations while others apply self-attention over the output sequence, either masked or not masked.

When the attention neural network includes a decoder neural network that operates directly on the input sequence, the attention layers within the decoder can apply a self-attention mechanism over the input sequence. In this example, some or all of the layers in the decoder can apply the sparse attention mechanism that will be described below.

The specifics of the operation of the attention layers within the decoder neural network and the encoder neural network are described in more detail in Vaswani, et al, attention Is All You Need, arXiv:1706.03762, and Raffel, et al, Exploring the Limits of Transfer Learning with a Unified Text-to-Text Transformer, arXiv:1910.10683, and Devlin et al, *BERT: Pre-training of Deep Bidirectional Transformers for Language Understanding*, arXiv:1810.04805, the entire contents of which are hereby incorporated by reference herein in their entirety.

FIG. 1 shows an example neural network system 100. The neural network system 100 is an example of a system implemented as computer programs on one or more computers in one or more locations, in which the systems, components, and techniques described below can be implemented.

The neural network system 100 can receive an input 102 and perform a machine learning task on the input 102 to generate an output 152.

As described above, the neural network system 100 can perform any of a variety of tasks that involves (i) operating on an input 102 that is an input sequence, (ii) generating an output 152 that is an output sequence, or (iii) both.

The neural network system 100 includes an attention neural network 150 that includes multiple attention layers, at least one of which is a sparse attention layer 110.

Each attention layer operates on an input sequence 104 and generates a corresponding output sequence 134.

Although one attention layer is depicted in FIG. 1 for convenience, as described above, the attention neural network 150 generally includes many other layers, including other attention layers and, for example, embedding layers and an output layer.

Specifically, the input sequence 104 has a respective input at each of a plurality of positions in an input order and the output sequence 134 has a respective output at each of the one or more positions. That is, the input sequence 102 has one or more inputs arranged according to an input order and the output sequence 134 has one or more outputs arranged according to an output order.

In general, the input sequence 104 can be any intermediate sequential data generated by the attention neural network 150 when performing the machine learning task on the input 102.

For example, when the attention layer 110 is the first attention layer in the neural network, the input sequence 104 can be embedded (i.e., numeric) representations of the system input 102 generated by an embedding layer.

As another example, the input sequence 104 can be an output sequence generated by a preceding attention layer or other layer in the attention neural network 150.

To generate the output sequence 134 from the input sequence 104, the sparse attention layer 110 includes one or more attention sub-layers 120 (also referred to as "attention heads") and, optionally, one or more position-wise feed-forward sub-layer(s) 130.

The one or more attention sub-layers 120 collectively generate a final attended input sequence 124 from the input sequence 104 that includes a respective final attended input at each of the input positions.

Each attention sub-layer 120 receives the input sequence 104 for the layer 110 and applies an attention mechanism on the input sequence for the layer to generate a respective attended input sequence.

For at least some of the attention layers in the neural network, each sub-layer 120 applies a sparse attention mechanism, i.e., instead of using conventional attention.

The sparse attention mechanism can be a single-head attention mechanism, where the attention layer includes only a single head, i.e., a single sub-layer 120, that applies a single sparse attention mechanism over the input sequence or a multi-head attention mechanism where the attention layer includes multiple heads, i.e., multiple attention sub-layers 120, and each of the multiple attention heads applies a respective sparse attention mechanism over the input sequence in parallel to generate a respective attended input sequence.

The attention layer then combines the outputs of the multiple attention heads, e.g., by concatenating the outputs, summing the outputs, or averaging the outputs, and, optionally, processing the concatenated outputs through a linear layer as part of generating the final attended input sequence 124 for the attention layer 110.

Applying a sparse attention mechanism will be described in more detail below with reference to FIG. 2.

As described above, the neural network generally includes multiple attention layers. All of the attention layers can apply sparse attention or some attention layers can apply sparse attention while other attention layers can apply conventional multi-head or single-head attention. Generally, an attention layer that applies sparse attention can be inserted in place of any conventional attention layer that performs self-attention in any attention neural network architecture, e.g., in any of the neural networks described in Vaswani, et al, *Attention Is All You Need*, arXiv:1706.03762, Raffel, et al, *Exploring the Limits of Transfer Learning with a Unified Text-to-Text Transformer*, arXiv:1910.10683, Devlin et al, *BERT: Pre-training of Deep Bidirectional Transformers for Language Understanding*, arXiv:1810.04805, Dai, et al, *Transformer XL: Attentive Language Models Beyond a Fixed-Length Context*, arXiv:1901.02860, and Kitaev, et al, Reformer: The Efficient Transformer, arXiv: 2001.04451, the entire contents of which are hereby incorporated by reference herein in their entirety.

A self-attention mechanism is an attention mechanism where the queries, keys, and values used by the mechanism are all generated from the input sequence to the attention sub-layer, i.e., the set of memory vectors is the same as the input sequence to the layer.

In some cases, the combined attended input sequence generated from the attended input sequence(s) is the final output of the attention mechanism, i.e., is the final attended input sequence 124. In some other cases, the attention layer applies one or more other operations, e.g., residual connections, layer normalization, or both, to the combined attended input sequence to generate the sequence 124.

When included, the one or more feed-forward sub-layer(s) 130 then operates on the final attended input sequence 124 to generate an output sequence 134 for the layer 110 by applying a series of operations on each attended input of the final attended input sequence in parallel, e.g., by processing each attended input through a fully-connected neural network and then, optionally, applying layer normalization, a residual connection, or both to the output of the fully-connected neural network. As a particular example, the fully-connected neural network can apply, to each attended input in parallel, one linear transformation, followed by an activation function, e.g., a non-linear elementwise activation function, e.g., a ReLU activation function, and then followed by another linear transformation.

When the feed-forward sub-layer 130 is not included, the final attended input sequence 124 is the output sequence 134 for the layer.

Generally, the layers within the attention neural network can be arranged in any of a variety of configurations and the attention mechanism applied by the attention sub-layer 120 depends on the configuration of the attention neural network 150.

As one example, when the network input is an input sequence and the attention neural network 150 includes an encoder neural network that, in turn, includes a subset of the plurality of layers and that encodes the input sequence to generate a respective encoded representation of each input in the sequence, the attention sub-layer 120 can be included in one of the layers of the encoder.

As another example, when the network input is an input sequence and the attention neural network 150 includes a decoder neural network that includes a subset of the plurality of layers and that processes the network input to generate the network output, the attention sub-layer 120 can be included in one of the layers of the decoder.

As used in this specification, the term "learned" means that an operation or a value has been adjusted during the training of the attention neural network 150.

Figure 2A:
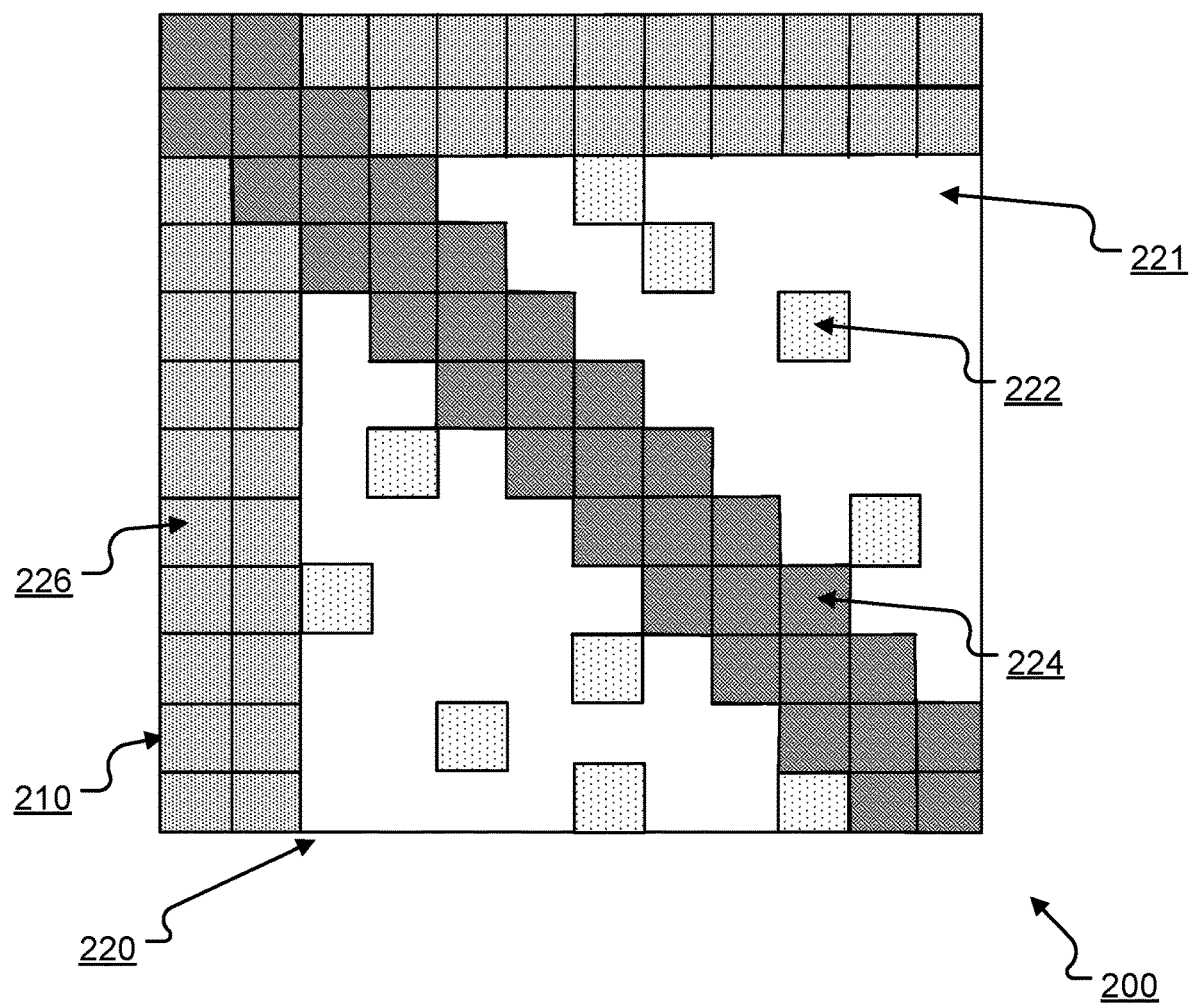
FIG. 2A is an illustration of a sparse attention mechanism being applied.

FIG. 2A is an illustration 200 of a sparse attention mechanism being applied to an input sequence. As described above, the sparse attention mechanism can be applied by one of multiple attention heads of an attention-sub layer or by an attention sub-layer that has a single attention head. For the sake of clarity, the sparse attention mechanism will be described as being performed by an attention sub-layer, which can correspond to either the single attention head of a sparse attention layer or to one of multiple attention heads of the sparse attention layer, in the example of FIG. 2A.

To apply the attention mechanism, the attention sub-layer obtains (i) a sequence of queries derived from an input sequence to the sparse attention layer, (ii) a sequence of keys derived from the input sequence to the sparse attention layer, and (iii) a sequence of value inputs derived from the input sequence to the sparse attention layer.

For example, the sub-layer can generate the queries, keys, and values by applying different, learned linear transformations to the input sequence.

In other words, the sub-layer can apply a respective query linear transformation to the input sequence to generate the sequence of queries for the sub-layer, apply a respective key linear transformation to the input sequence to generate the sequence of keys for the sparse attention sub-layer, and apply a value linear transformation to the input sequence to generate the sequence of value inputs for the sparse attention sub-layer. Each linear transformation can include multiplying each input in the sequence by a corresponding learned weight matrix and, optionally, adding a corresponding learned bias.

In the example of FIG. 2A, the input sequence includes twelve input positions, and the queries for the input positions are represented on the y-axis 210 while the keys for the twelve input positions are represented on the x-axis 220.

The sub-layer then generates an attended input sequence that includes a respective attended input at each of the plurality of input positions.

In particular, the sub-layer identifies a first proper subset of the input positions. In the example of FIG. 2A, the first proper subset includes the first two of the twelve input positions. For each input position in the first proper subset, the sub-layer generates the attended input at the input position by first using the query at the input position to attend over all of the keys in the sequence of keys to generate a respective weight for all of the input positions and then computing a weighted sum of the value inputs at all of the input positions in accordance with the respective weights. That is, the weight for a given value input in the weighted sum is equal to the weight for the input position corresponding to the given value input.

In more detail, the weights for a given input position in the first subset can be equal to the output of a scoring function, e.g., a softmax or a hardmax function, applied to the product of (i) the query for the given input position and (ii) a matrix of the keys for all of the input positions in the input sequence. Optionally, the system can apply a scaling factor to the product before computing the scoring function.

Thus, the attended input for each of the input positions in the first proper subset depends on the query for the input position and the keys and values for all of the input positions in the sequence, including all of the positions outside of the first proper subset.

The sub-layer also identifies a second proper subset of the input positions and, for each input position in the proper subset, a corresponding proper subset of the input positions. In particular, the sub-layer can identify, as the second proper subset, the positions that are not in the first proper subset, i.e., can divide the input positions into the first and second proper subset. Thus, in the example of FIG. 2A, the positions in the second proper subset are the remaining ten positions that are not in the first proper subset.

The corresponding proper subset for any given input position in the second subset includes the first proper subset of the input positions and one or more input positions outside of the first proper subset of the input positions.

For each input position in the second proper subset, the sub-layer generates the attended input at the input position by using the query at the input position to attend over only the keys at a corresponding proper subset of the input positions to generate a respective weight for each of the input positions in the corresponding proper subset and computing a weighted sum of the value inputs at the corresponding proper subset of the input positions in accordance with the respective weights for the corresponding proper subset of the input positions. That is, the weight for a given value input in the weighted sum is equal to the weight for the input position corresponding to the given value input.

In more detail, the weights for a given input position in the second subset can be equal to the output of a scoring function, e.g., a softmax or a hardmax function, applied to the product of (i) the query for the given input position and (ii) a matrix of the keys for the corresponding proper subset of the input positions. Optionally, the system can apply a scaling factor to the product before computing the scoring function.

More specifically, for each particular position in the second proper subset, the one or more input positions outside of the first proper subset include one or more input positions that are randomly selected from the input positions that are outside of the first proper subset.

In some cases, for each particular position in the second proper subset, the one or more input positions outside of the first proper subset include each input position that is within a window of a fixed number of positions of the particular input position in the second proper subset.

Thus, the queries for positions in the second subset attend to significantly less than all of the keys for the positions in the input sequence. In particular, because the query for a given input position only attends to the keys for the positions in the first subset and a small number of positions in the second subset, there are many positions in the second subset to which the query for the given input position does not attend.

This attention scheme is illustrated in FIG. 2A.

In FIG. 2A, blank cells 221 indicate that no attention occurs between the corresponding query and key, global cells 226 illustrate "global attention" that includes one of the positions in the first subset, random cells 222 illustrate "random attention" between a query for a position in the second subset and a set of randomly selected keys for other positions in the second subset, and window cells 224 illustrate "window attention" between a query for a position in the second subset and each of a set of keys for positions that are within a window of the position.

More specifically, as shown in FIG. 2A, the first proper subset includes the first two input positions in the sequence and the second proper subset includes the remaining ten input positions in the sequence. For each position in the second subset, the query for the position attends to two randomly selected keys and all keys for positions that are within a window of size three of the position.

The system can select the one or more "global positions," i.e., the one or more positions that are in the first subset, in any of a variety of ways.

As one example, when the network input is a sequence having a respective token at each of a plurality of the input positions, the attentional neural network can augment the network input by adding one or more pre-determined global tokens before processing the network input, e.g., to the beginning of the network input, and the first proper subset of input positions can correspond to the positions at which the one or more global tokens are added.

As another example, when the network input is a sequence having a respective token at each of a plurality of the input positions, the attention neural network is configured to designate a fixed number of the plurality of input positions, e.g., a fixed number of the initial positions or final positions in the input sequence or a fixed number of the initial positions and a fixed number of the final positions, as the first proper subset of input positions, i.e., without augmenting the network input with any additional tokens.

When there are multiple sub-layers ("attention heads") in a given sparse attention layer, the sparse attention layer can combine the attended input sequences generated by each of the sub-layers as described above to generate the final attended input sequence.

Moreover, the described attention scheme is designed to be optimized for execution on hardware accelerators, e.g., graphics processing units (GPUs) and tensor processing units (TPUs) that perform matrix multiplication in hardware. In particular, as described above, the described attention is advantageous over conventional attentional mechanisms because only a small subset of positions attend over all of the positions in the sequence while the remaining subset of positions attend over only a sparse subset of positions.

By appropriately selecting which positions are in the first subset of positions and which positions are in the corresponding subset for each position that is in the second subset of positions, the described techniques can leverage additional advantages that result from GPUs and TPUs being designed to offer additional computational advantages, e.g. in terms of latency and throughput, when making use of coalesced memory operations which load blocks of contiguous bytes at once.

Figure 2B:
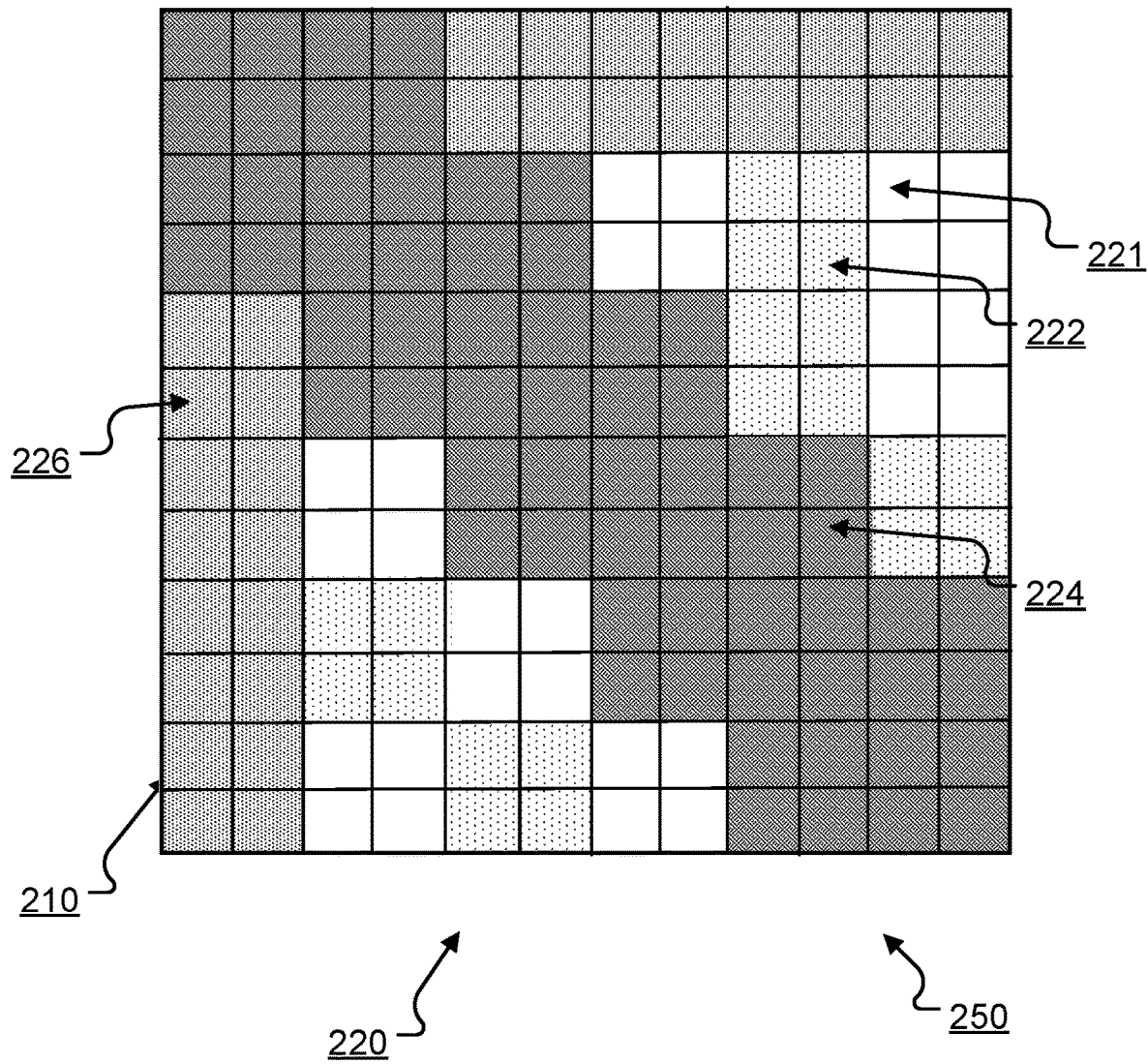
FIG. 2B is an illustration of a sparse attention scheme in which the queries and keys are divided into blocks.

FIG. 2B is an illustration 250 of a sparse attention scheme in which the input queries and keys are divided into blocks.

In particular, in the example illustrated in FIG. 2B, there are again twelve input positions, with queries represented on the y-axis 210 and keys on the x-axis 220, but in this example, the queries are divided into query blocks of a fixed size and the keys are divided into blocks of a fixed size. In the example of FIG. 2, the fixed size is equal to two.

Then, the determination of which positions are in the first proper subset and which positions are in the corresponding proper subset for each position in the second subset takes into account the query block and key block assignments.

For global attention, the system selects the positions corresponding to one or more of the query blocks or key blocks as the positions that are included in the first proper subset. In the example of FIG. 2B, the system has selected the input positions corresponding to the first query block as the positions in the first proper subset.

For random attention, for each query block, the system randomly selects a key block and then includes the positions corresponding to the selected key block in the corresponding subsets for the input positions in the query block. In the example of FIG. 2B, the system has randomly selected one key block for each query block.

Similarly, for window attention, for each query block j, the corresponding proper subset for each position in the query block j includes the input positions corresponding to the key blocks $j-(w-1)/2$ to $j+(w+1)/2$, where w is a positive constant that defines the size of the windows for the positions in query block j. In the example of FIG. 2B, w is equal to 1.

Like in FIG. 2A, blank cells 221 indicate that no attention occurs between the corresponding query and key, global cells 226 illustrate "global attention" that includes one of the positions in the first subset, random cells 222 illustrate "random attention" between a query for a position in the second subset and a set of randomly selected keys for other positions in the second subset, and window cells 224 illustrate "window attention" between a query for a position in the second subset and each of a set of keys for positions that are within a window of the position. However, as seen in FIG. 2B, the blank cells, global cells, and window cells are the same for each query within a given query block.

By selecting the keys that are used in computing the attention for each query by dividing the queries and keys into blocks, the system can ensure that a hardware accelerator, e.g., a GPU or a TPU, can make use of coalesced memory operations (which load blocks of contiguous bytes at once) when loading the queries and keys in order to perform the multiplications required to generate the weights for each query position in hardware, decreasing the latency of performing inference using the attention neural network when deployed on one or more hardware accelerators.

Additionally, while only twelve positions are illustrated in FIGS. 2A and 2B for ease of presentation, in general, the input sequences to the sub-layer can have many more input positions and the number of positions in the first proper subset can be significantly smaller than the total number of positions in the input sequence. As a particular example, the input sequence can have 4000 or more positions, while having between 100 and 500 positions in the first subset that attend to the entire sequence. Thus, the first proper subset of positions that includes the global tokens can include no more than 15/100ths as many tokens as the second proper subset that includes the other tokens.

Moreover, the size of the corresponding subset for each input position in the second subset can be significantly less than the total size of the second subset, making the attention very sparse for those positions that are in the second subset. In the above example, where the input sequence has 4000 or more positions and the second subset includes between 3500 and 3900 positions, the corresponding subset for each position in the second subset can have only approximately 300 positions, so that the query for each position in the second subset attends to no more than 10/100ths of the keys for the positions in the second subset.

Figure 3:
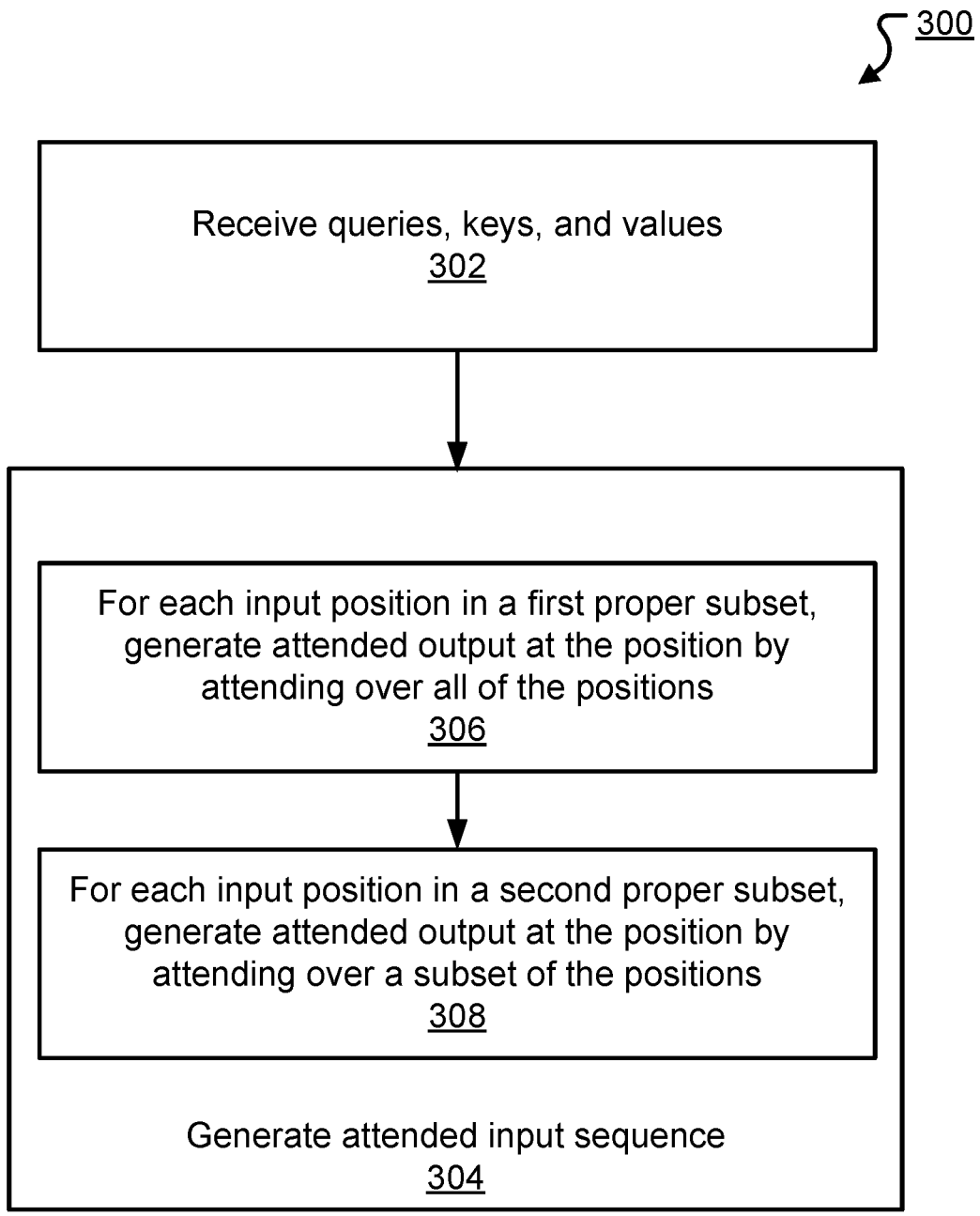
FIG. 3 is a flow diagram of an example process for applying a sparse attention mechanism.

FIG. 3 is a flow diagram of an example process 300 for applying a sparse attention mechanism. For convenience, the process 300 will be described as being performed by a system of one or more computers located in one or more locations. For example, a neural network system, e.g., neural network system 100 of FIG. 1, appropriately programmed in accordance with this specification, can perform the process 300.

The process 300 can be performed by each sub-layer of a sparse attention layer to generate a respective attended input sequence for the sub-layer The system receives (i) a sequence of queries derived from an input sequence to the sparse attention layer, the sequence of queries having a respective query at each of a plurality of input positions; (ii) a sequence of keys derived from the input sequence to the sparse attention layer, the sequence of keys having a respective key at each of the plurality of input positions; and (iii) a sequence of value inputs derived from the input sequence to the sparse attention layer, the sequence of value inputs having a respective value input at each of the plurality of input positions (step 302).

The system then generates an attended input sequence that has a respective attended input at each of the plurality of input positions (step 304).

In particular, for each input position in a first proper subset of the input positions, the system generates the attended input at the position by attending over all of the positions in the input sequence (step 306). More specifically, for a given input position that is in the first proper subset, the system generates the attended input at the given input position by first using the query at the input position to attend over all of the keys in the sequence of keys to generate a respective weight for all of the input positions and then computing a weighted sum of the value inputs at all of the input positions in accordance with the respective weights.

For each input position in a second proper subset of the input positions, the system generates the attended input at the input position by attending over a proper subset, i.e., significantly less than all, of the input positions in the input sequence (step 308).

More specifically, for a given input position that is in the second proper subset, the system generates the attended input at the given input position by first using the query at the input position to attend over only the keys at a corresponding proper subset of the input positions to generate a respective weight for each of the input positions in the corresponding proper subset and then computing a weighted sum of the value inputs at the corresponding proper subset of the input positions in accordance with the respective weights for the corresponding proper subset of the input positions.

As described above, the corresponding proper subset of input positions for each input position in the second proper subset includes the first proper subset of the input positions; and one or more input positions outside of the first proper subset of the input positions.

During the processing of a given network input, for each sparse attention layer in the attention neural network, the system can perform the process 300 to update the input sequence to the layer. By repeatedly performing this processing for all of the attention layers in the attention neural network and then by processing at least part of the output sequence generated by the last attention layer in the attention neural network using one or more output layers, e.g., one or more linear layers optionally followed by a softmax layer or, more generally, a multi-layer perceptron (MLP), the system can generate a network output for a received network input.

That is, the process 300 can be performed as part of predicting an output for an input for which the desired output, i.e., the output that should be generated by the system for the input sequence, is not known.

The process 300 can also be performed as part of processing inputs derived from a set of training data, i.e., inputs derived from a set of inputs for which the output that should be generated by the system is known, in order to train the attention neural network to determine trained values for the parameters of the attention neural network. The system can repeatedly perform the process 300 on inputs selected from a set of training data as part of a conventional machine learning training technique to train the attention layers and the output layer(s) of the neural network, e.g., a gradient descent with backpropagation training technique that uses a conventional optimizer, e.g., stochastic gradient descent, RMSprop, or Adam optimizer, to optimize an objective function that is appropriate for the task that the attention neural network is configured to perform. During training, the system can incorporate any number of techniques to improve the speed, the effectiveness, or both of the training process. For example, the system can use dropout, label smoothing, or both to reduce overfitting. As another example, the system can perform the training using a distributed architecture that trains multiple instances of the attention neural network in parallel. Moreover, the system can first pre-train the neural network on a large unsupervised data set through unsupervised learning, e.g., to minimize a BERT loss or other unsupervised loss, and then fine-tune the neural network on task-specific training data to optimize the objective function for the task.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a data communication network.

In this specification, the term "database" is used broadly to refer to any collection of data: the data does not need to be structured in any particular way, or structured at all, and it can be stored on storage devices in one or more locations. Thus, for example, the index database can include multiple collections of data, each of which may be organized and accessed differently.

Similarly, in this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework, a Microsoft Cognitive Toolkit framework, an Apache Singa framework, or an Apache MXNet framework.

Embodiments of the subject matter described in this specification can be implemented in a computing system that includes a back end component, e.g., as a data server, or that includes a middleware component, e.g., an application server, or that includes a front end component, e.g., a client computer having a graphical user interface, a web browser, or an app through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A system for performing a machine learning task on a network input to generate a network output, the system comprising one or more computers and one or more storage devices storing instructions that, when executed by the one or more computers, cause the one or more computers to implement:
  an attention neural network configured to perform the machine learning task, the attention neural network comprising one or more sparse attention layers, each sparse attention layer comprising one or more sparse attention sub-layers, each sparse attention sub-layer configured to:
    receive a sequence of queries derived from an input sequence to the sparse attention layer, the sequence of queries having a respective query at each of a plurality of input positions;
    receive a sequence of keys derived from the input sequence to the sparse attention layer, the sequence of keys having a respective key at each of the plurality of input positions;
    receive a sequence of value inputs derived from the input sequence to the sparse attention layer, the sequence of value inputs having a respective value input at each of the plurality of input positions; and
    generate an attended input sequence comprising a respective attended input at each of the plurality of input positions, comprising:
      for each input position in a first proper subset of the input positions, generating the attended input at the input position by:
        using the query at the input position to attend over all of the keys in the sequence of keys to generate a respective weight for all of the input positions and computing a weighted sum of the value inputs at all of the input positions in accordance with the respective weights; and
      for each input position in a second proper subset of the input positions, generating the attended input at the input position by:
        using the query at the input position to attend over only the keys at a corresponding proper subset of the input positions to generate a respective weight for each of the input positions in the corresponding proper subset and computing a weighted sum of the value inputs at the corresponding proper subset of the input positions in accordance with the respective weights for the corresponding proper subset of the input positions, the corresponding proper subset of input positions for each input position in the second proper subset including:
the first proper subset of the input positions; and
one or more input positions outside of the first proper subset of the input positions.

2. The system of claim 1, wherein the one or more input positions outside of the first proper subset include:
one or more input positions randomly selected from the input positions that are outside of the first proper subset.

3. The system of claim 1, wherein the one or more input positions outside of the first proper subset include:
each input position that is within a window of a fixed number positions of the input position in the second proper subset.

4. The system of claim 1, wherein the network input is a sequence having a respective token at each of a plurality of the input positions, and wherein the attention neural network is configured to augment the network input by adding one or more pre-determined global tokens before processing the network input, and wherein the first proper subset of input positions correspond to the positions at which the one or more global tokens are added.

5. The system of claim 1, wherein the network input is a sequence having a respective token at each of a plurality of the input positions, and wherein the attention neural network is configured to designate a fixed number of the plurality of input positions as the first proper subset of input positions.

6. The system of claim 1, wherein each of the one or more sparse attention layers applies, for each sparse attention sub-layer, a respective query linear transformation to the input sequence to generate the sequence of queries for the sub-layer.

7. The system of claim 1, wherein each of the one or more sparse attention layers applies, for each sparse attention sub-layer, a respective key linear transformation to the input sequence to generate the sequence of keys for the sparse attention sub-layer.

8. The system of claim 1, wherein each of the one or more sparse attention layers applies, for each sparse attention sub-layer, a respective value linear transformation to the input sequence to generate the sequence of value inputs for the sparse attention sub-layer.

9. The system of claim 1, wherein each sparse attention layer is further configured to:
generate a final attended input sequence from the attended input sequences generated by the one or more sub-layers.

10. The system of claim 9, wherein each sparse attention layer further comprises:
one or more position-wise feed-forward layers that are configured to generate an output sequence for the layer from the final attended input sequence, the output sequence comprising a respective layer output at each of the plurality of input positions, and the generating comprising, for each of the plurality of input positions:
receiving an attended layer input at the input position, and
applying a sequence of transformations to the attended layer input at the input position to generate a layer output for the input position.

11. One or more non-transitory computer-readable storage media storing instructions that when executed by one or more computers cause the one or more computers to implement an attention neural network configured to perform a machine learning task,
the attention neural network comprising one or more sparse attention layers, each sparse attention layer comprising one or more sparse attention sub-layers, each sparse attention sub-layer configured to:
receive a sequence of queries derived from an input sequence to the sparse attention layer, the sequence of queries having a respective query at each of a plurality of input positions;
receive a sequence of keys derived from the input sequence to the sparse attention layer, the sequence of keys having a respective key at each of the plurality of input positions;
receive a sequence of value inputs derived from the input sequence to the sparse attention layer, the sequence of value inputs having a respective value input at each of the plurality of input positions; and
generate an attended input sequence comprising a respective attended input at each of the plurality of input positions, comprising:
for each input position in a first proper subset of the input positions, generating the attended input at the input position by:
using the query at the input position to attend over all of the keys in the sequence of keys to generate a respective weight for all of the input positions and computing a weighted sum of the value inputs at all of the input positions in accordance with the respective weights; and
for each input position in a second proper subset of the input positions, generating the attended input at the input position by:
using the query at the input position to attend over only the keys at a corresponding proper subset of the input positions to generate a respective weight for each of the input positions in the corresponding proper subset and computing a weighted sum of the value inputs at the corresponding proper subset of the input positions in accordance with the respective weights for the corresponding proper subset of the input positions, the corresponding proper subset of input positions for each input position in the second proper subset including:
the first proper subset of the input positions; and
one or more input positions outside of the first proper subset of the input positions.

12. A method comprising:
receiving a network input; and
processing the network input using an attention neural network to generate a network output for a machine learning task for the network input, the attention neural network comprising one or more sparse attention layers, each sparse attention layer comprising one or more sparse attention sub-layers, each sparse attention sub-layer configured to:
receive a sequence of queries derived from an input sequence to the sparse attention layer, the sequence of queries having a respective query at each of a plurality of input positions;
receive a sequence of keys derived from the input sequence to the sparse attention layer, the sequence of keys having a respective key at each of the plurality of input positions;
receive a sequence of value inputs derived from the input sequence to the sparse attention layer, the sequence of value inputs having a respective value input at each of the plurality of input positions; and generate an attended input sequence comprising a respective attended input at each of the plurality of input positions, comprising:
  for each input position in a first proper subset of the input positions, generating the attended input at the input position by:
    using the query at the input position to attend over all of the keys in the sequence of keys to generate a respective weight for all of the input positions and computing a weighted sum of the value inputs at all of the input positions in accordance with the respective weights; and
  for each input position in a second proper subset of the input positions, generating the attended input at the input position by:
    using the query at the input position to attend over only the keys at a corresponding proper subset of the input positions to generate a respective weight for each of the input positions in the corresponding proper subset and computing a weighted sum of the value inputs at the corresponding proper subset of the input positions in accordance with the respective weights for the corresponding proper subset of the input positions, the corresponding proper subset of input positions for each input position in the second proper subset including:
      the first proper subset of the input positions; and
      one or more input positions outside of the first proper subset of the input positions.

13. The method of claim 12, wherein the one or more input positions outside of the first proper subset include:
  one or more input positions randomly selected from the input positions that are outside of the first proper subset.

14. The method of any one of claim 12, wherein the one or more input positions outside of the first proper subset include:
  each input position that is within a window of a fixed number positions of the input position in the second proper subset.

15. The method of claim 12, wherein the network input is a sequence having a respective token at each of a plurality of the input positions, and wherein the attention neural network is configured to augment the network input by adding one or more pre-determined global tokens before processing the network input, and wherein the first proper subset of input positions correspond to the positions at which the one or more global tokens are added.

16. The method of claim 12, wherein the network input is a sequence having a respective token at each of a plurality of the input positions, and wherein the attention neural network is configured to designate a fixed number of the plurality of input positions as the first proper subset of input positions.

17. The method of claim 12, wherein each of the one or more sparse attention layers applies, for each sparse attention sub-layer, a respective query linear transformation to the input sequence to generate the sequence of queries for the sub-layer.

18. The method of claim 12, wherein each of the one or more sparse attention layers applies, for each sparse attention sub-layer, a respective key linear transformation to the input sequence to generate the sequence of keys for the sparse attention sub-layer.

19. The method of claim 12, wherein each of the one or more sparse attention layers applies, for each sparse attention sub-layer, a respective value linear transformation to the input sequence to generate the sequence of value inputs for the sparse attention sub-layer.

20. The method of claim 12, wherein each sparse attention layer is further configured to:
  generate a final attended input sequence from the attended input sequences generated by the one or more sub-layers.

* * * * *